US011010863B2

(12) United States Patent
Imbrogno et al.

(10) Patent No.: US 11,010,863 B2
(45) Date of Patent: May 18, 2021

(54) BINDPOINT EMULATION

(71) Applicant: Apple Inc., Cupertino, CA (US)

(72) Inventors: Michael Imbrogno, San Jose, CA (US); Sivert Berg, London (GB); Nicholas H. Smith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/786,173

(22) Filed: Feb. 10, 2020

(65) Prior Publication Data

US 2021/0097643 A1 Apr. 1, 2021

Related U.S. Application Data

(60) Provisional application No. 62/907,442, filed on Sep. 27, 2019.

(51) Int. Cl.
| | |
|---|---|
| *G06F 9/30* | (2018.01) |
| *G06T 15/04* | (2011.01) |
| *G06F 8/41* | (2018.01) |
| *G06T 1/60* | (2006.01) |
| *G06T 1/20* | (2006.01) |
| *G06F 12/06* | (2006.01) |

(52) U.S. Cl.
CPC ............... *G06T 1/60* (2013.01); *G06F 8/441* (2013.01); *G06F 9/30098* (2013.01); *G06F 9/30141* (2013.01); *G06F 12/0646* (2013.01); *G06T 1/20* (2013.01); *G06T 15/04* (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 6,426,753 B1 * | 7/2002 | Migdal | .................. G06T 15/04 |
| | | | 345/506 |
| 7,928,988 B1 | 4/2011 | Levas | |
| 8,471,858 B2 | 6/2013 | Ritts | |
| 9,805,439 B2 | 10/2017 | Diard | |
| | (Continued) | | |

OTHER PUBLICATIONS

Nicholas, "The CUDA Handbook: A Comprehensive Guide to GPU Programming," Jun. 2013.

*Primary Examiner* — Joni Hsu
(74) *Attorney, Agent, or Firm* — Blank Rome LLP

(57) ABSTRACT

A computer-implemented technique for accessing textures by a graphics processing unit (GPU), includes determining a frequency with which a first texture is expected to be accessed by an application executing on a GPU, determining a frequency with which a second texture is expected to be accessed by an application executing on the GPU, determining to load memory address information associated with the first texture into a GPU register when the frequency is greater than or equal to a threshold frequency value, determining to load memory address information associated with the second texture into a buffer memory when the frequency is less than the threshold frequency value, receiving a draw call utilizing the texture, rendering the draw call using the first texture by accessing the memory address information in the GPU register, and the second texture by accessing the memory address information in the buffer memory.

20 Claims, 6 Drawing Sheets

(56) References Cited

U.S. PATENT DOCUMENTS

| | | |
|---|---|---|
| 10,019,271 B2 | 7/2018 | Hsiao |
| 2009/0128575 A1* | 5/2009 | Liao .................. G06T 15/04 |
| | | 345/552 |
| 2014/0198122 A1* | 7/2014 | Grossman .............. G06T 9/00 |
| | | 345/582 |
| 2015/0143061 A1* | 5/2015 | Khailany ............ G06F 8/4432 |
| | | 711/154 |
| 2015/0193234 A1* | 7/2015 | Udayakumaran ....... G06F 8/441 |
| | | 712/3 |
| 2016/0078637 A1 | 3/2016 | Park |
| 2016/0078666 A1 | 3/2016 | Park |
| 2019/0066352 A1 | 2/2019 | Kazakov |

* cited by examiner

| 370 APPLICATION A | 371 PHOTOS | 372 FINANCIAL MANAGEMENT APPLICATION | 373 MOVIE APPLICATION | 374 APPLICATION B |
|---|---|---|---|---|
| 360 OTHER APPLICATION SERVICES | 361 GAME ENGINE | 362 3D RENDERING ENGINE | 363 ANIMATION ENGINE | 364 RENDERING ENGINE |
| 350 O/S SERVICES | 351 OPENGL | 352 METAL | 353 SOFTWARE RAYTRACER | 354 SOFTWARE RASTERIZER |
| O/S KERNEL 345 | | | | |
| HARDWARE 340 | | | | |

BINDPOINT EMULATION

This application claims priority to U.S. Provisional Application No. 62/907,442, filed Sep. 27, 2019, which is hereby incorporated by reference.

BACKGROUND

The disclosed subject matter relates to the field of graphic processing. More specifically, but not by way of limitation, the disclosed subject matter relates to techniques for accessing textures by a graphics processor.

Computers and other computational devices typically have at least one programmable processing element that is generally known as a central processing unit (CPU). They frequently also have other programmable processors that are used for specialized processing of various types, such as graphic processing operations, which may be performed by graphic processing units (GPUs). GPUs generally comprise multiple cores or processing elements designed for executing the same instruction on parallel data streams, making GPUs more effective than general-purpose CPUs for algorithms in which processing of large blocks of data is done in parallel. In general, a CPU functions as the host and hands-off specialized parallel tasks to the GPUs.

SUMMARY

One disclosed embodiment includes a computer-implemented technique for accessing textures by a graphics processor. The technique includes determining a frequency with which a first texture is expected to be accessed by an application executing on a GPU, determining a frequency with which a second texture is expected to be accessed by an application executing on the GPU, determining to load memory address information associated with the first texture into a GPU register when the frequency is greater than or equal to a threshold frequency value, determining to load memory address information associated with the second texture into a buffer memory when the frequency is less than the threshold frequency value, receiving a draw call utilizing the texture, rendering the draw call using the first texture by accessing the memory address information in the GPU register, and the second texture by accessing the memory address information in the buffer memory.

Another aspect of the present disclosure relates to a non-transitory program storage device comprising instructions stored thereon to cause one or more graphics processors to determine a frequency with which a texture is expected to be accessed by an application executing on a graphics processing unit (GPU), determine whether to load memory address information associated with the texture into a GPU register or a buffer memory based on a comparison of the frequency to a threshold frequency value, in response to determining that the memory address information has been loaded into the GPU register rendering a draw call using the texture by accessing the memory address information in the GPU register, and in response to determining that the memory address information has not been loaded into the GPU, rendering the draw call using the texture by accessing the memory address information in the buffer memory.

Another aspect of the present disclosure relates to electronic device, comprising a memory, a display, a user interface, and one or more graphic processors operatively coupled to the memory, wherein the one or more graphic processors are configured to execute instructions causing the one or more graphic processors to determine a frequency with which a first texture is expected to be accessed by an application executing on a graphics processing unit (GPU), determine a frequency with which a second texture is expected to be accessed by an application executing on the GPU, determine to load memory address information associated with the first texture into a GPU register based on a comparison to a threshold frequency value, determine to load memory address information associated with the second texture into a buffer memory based on a comparison to the threshold frequency value, and render a draw call using the first texture by accessing the memory address information in the GPU register, and the second texture by accessing the memory address information in the buffer memory.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

FIG. 3 is a block diagram showing an illustrative software architecture diagram according to one or more embodiments of the disclosed subject matter according to an embodiment of the disclosure.

DETAILED DESCRIPTION

In the following description, for purposes of explanation, numerous specific details are set forth in order to provide a thorough understanding of the invention. It will be apparent, however, to one skilled in the art that the disclosed examples may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment, and multiple references to "one embodiment"

or "an embodiment" should not be understood as necessarily all referring to the same embodiment.

As used herein, the term "a computer system" refers to a single computer system or a plurality of computer systems working together to perform the function described as being performed on or by a computer system. Similarly, a machine-readable medium can refer to a single physical medium or to a plurality of media that may together contain the indicated information stored thereon. Reference to a processor refers to a single processing element or to a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of systems having the benefit of this disclosure and being of ordinary skill in the design and implementation of computing systems and/or graphic systems.

Figure 1:
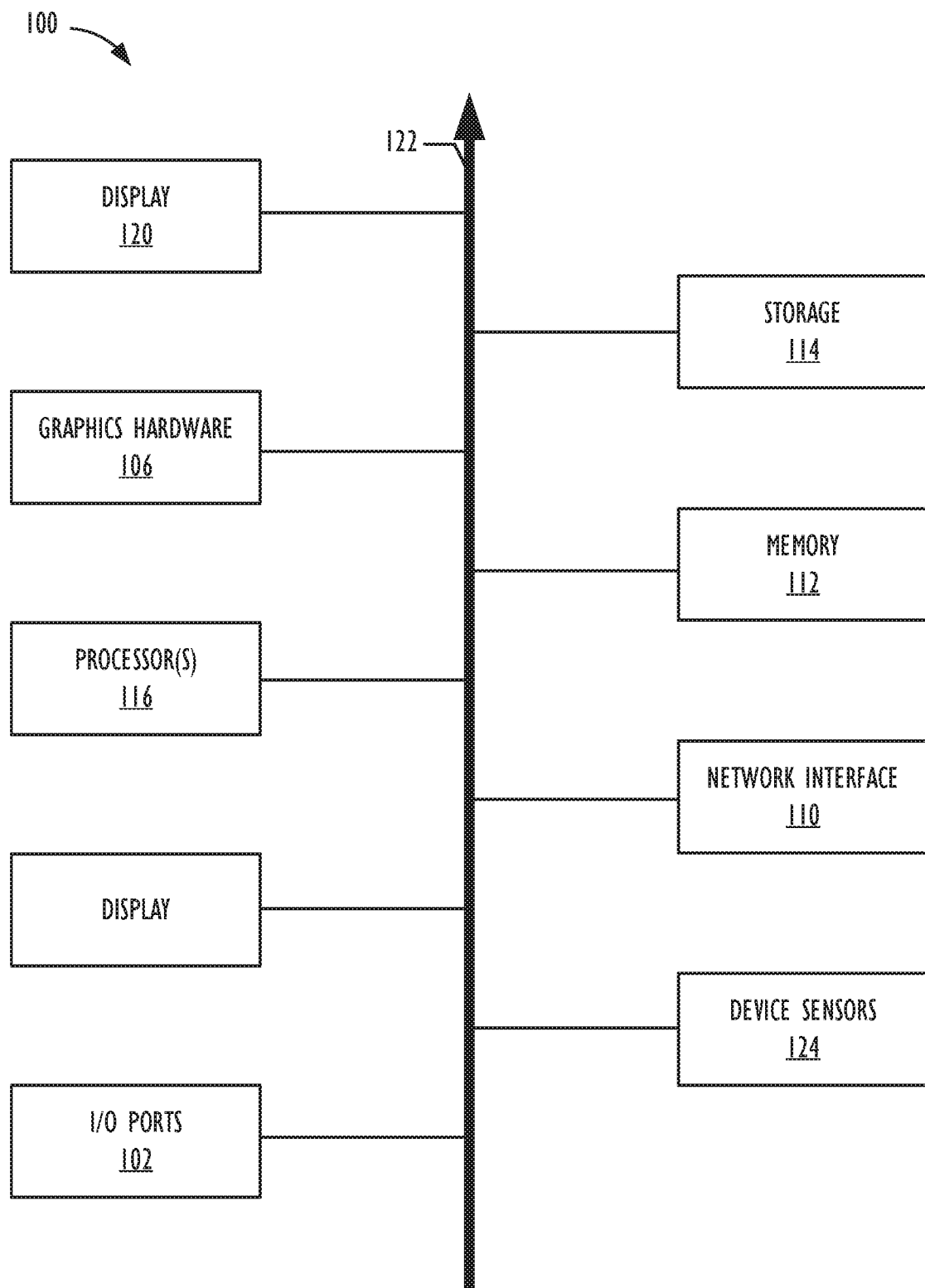
FIG. 1 is a block diagram illustrating a computer system that may be used, for example, as an end-user or developer computer system according to an embodiment of the disclosure.

Referring to FIG. 1, the disclosed embodiments may be performed by representative computer system 100. For example, the representative computer system 100 may act as a software development platform or an end-user device. While FIG. 1 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems and other consumer electronic devices, etc.) which have fewer components or perhaps more components may also be used to implement one or more embodiments.

As illustrated in FIG. 1, computer system 100 includes bus 122 which is coupled to one or more processor(s) 116, which may be CPUs and/or digital signal processors (DSPs), memory 112, which may include one or both of a volatile read/write random access memory (RAM) and a read-only memory (ROM), and a non-volatile storage device 114 (e.g., a solid state storage drive). Processor(s) 116 may retrieve instructions from the memory 112 and/or storage device 114 and execute the instructions to perform operations described herein. Bus 122 interconnects these various components together and also interconnects processor 116, memory 112, and storage device 114 to display 120, I/O ports 102 and peripheral devices such as input/output (I/O) devices 104. I/O devices 104 may be pointing devices such as a mouse or stylus, keyboards, touch screens (e.g., display 120 and I/O devices 104 may be implemented as a single touch-sensitive display), modems, network interfaces, printers and other devices. Typically, Input/output devices 104 are coupled to the system through an input/output controller(s).

Computer system 100 may also include or be coupled to device sensors 124. Devices sensors 124 may include one or more of: depth sensors (such as a depth camera), three-dimensional (3D) depth sensor(s), imaging devices (such as a fixed and/or video-capable image capture unit), red-green-blue (RGB) sensors, proximity sensors, ambient light sensors, accelerometers, gyroscopes, any type of still or video camera, light detection and ranging (LIDAR) devices, Global Positioning Systems (GPS), microphones, charge coupled devices (CCDs) (or other image sensors), infrared sensors, thermometers, etc. These and other sensors may work in combination with one or more GPUs, digital signal processors (DSPs), or conventional microprocessors along with appropriate programming so that the sensor outputs may be properly interpreted and/or combined and interpreted.

Where volatile RAM is included in memory 112, the RAM may be implemented as dynamic RAM (DRAM), which requires continuous power in order to refresh or maintain the data in the memory. Graphic hardware 106 may be special purpose computational hardware for processing graphic and/or assisting processor(s) 116 in performing computational tasks. In some embodiments, graphic hardware 106 may include CPU-integrated graphic and/or one or more programmable GPUs.

Storage device 114 may be a magnetic hard drive, an optical drive, a non-volatile solid-state storage drive, or other types of storage systems, which maintain data (e.g. large amounts of data) even after power is removed from the system (i.e., non-volatile). While FIG. 1 shows that storage device 114 is a local device coupled directly to the rest of the components in the computer system 100, embodiments may utilize a non-volatile storage device which is remote from computer system 100, such as a network storage device which is coupled to the computer system 100 through network interface 110. Network interface may be a wired or wireless networking interface. Bus 122 may include one or more links connected to each other through various bridges, controllers, and/or adapters as is well known in the art. Although only a single element of each type is illustrated in FIG. 1 for clarity, multiple elements of any or all of the various element types may be used as desired.

Figure 2:
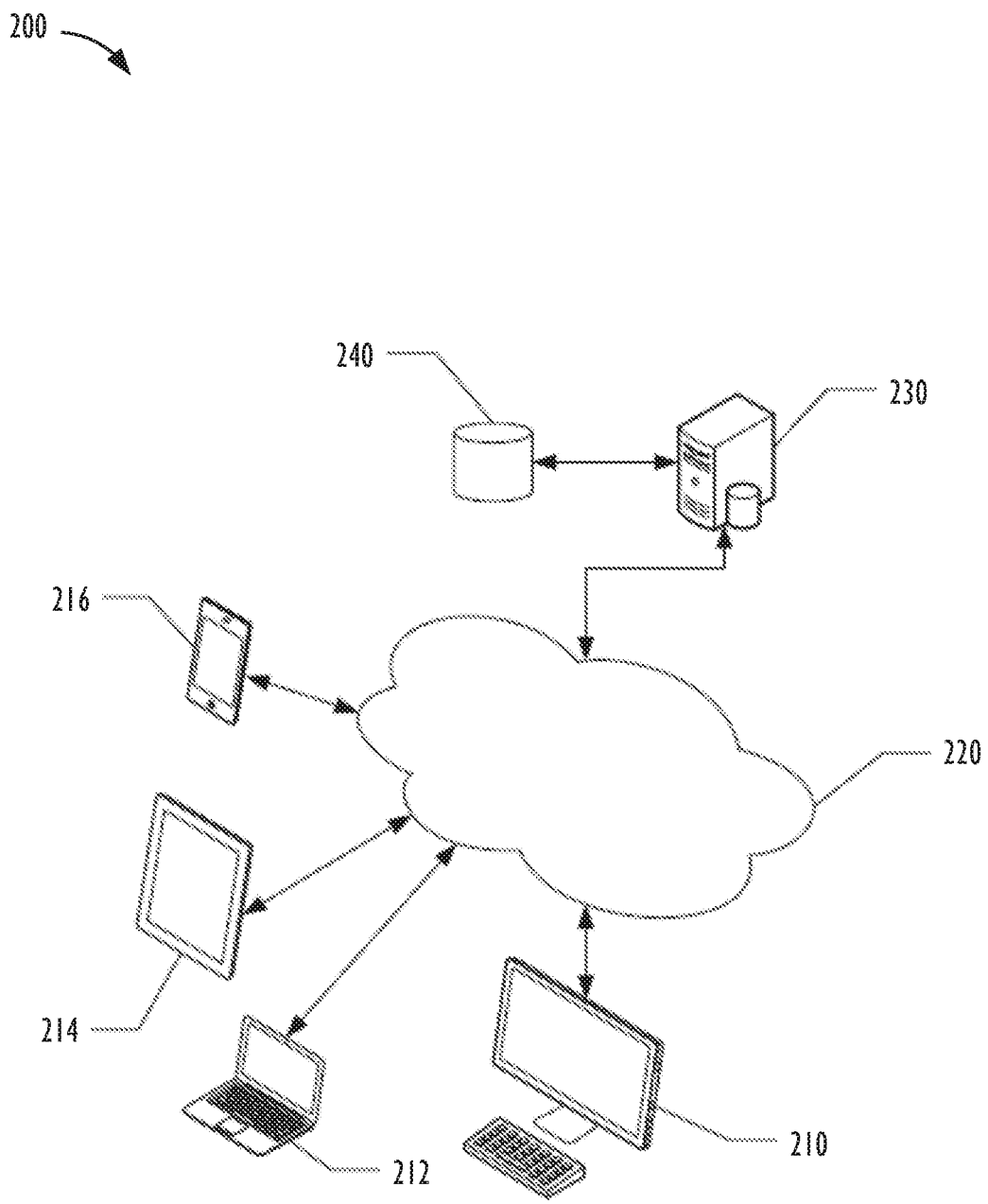
FIG. 2 is a block diagram illustrating a network environment that may be associated with one or more embodiments of the disclosed subject matter according to an embodiment of the disclosure.

Turning now to FIG. 2, a block diagram illustrates a network 200 of interconnected programmable devices, including server 230 and an associated datastore 240, as well as desktop computer system 210, notebook computer system 212, tablet computer system 214, and mobile phone 216. Other types of computer devices may be included as well. Any of these programmable devices may be the developer system or the target system shown as computing system 100 of FIG. 1. Network 220 interconnects the programmable devices and may be any type of network, wired or wireless, local or wide area, public or private, using any desired network communication protocols for transport of data from one system to the other. Although illustrated as a single network 220, any number of interconnected networks may be used to connect the various programmable devices, and each may employ a different network technology.

In one example, desktop system 210 may be a developer system, distributing a graphics application to server 230, which in turn may distribute the graphics application to multiple devices such as systems 212, 214, and 216, each of which may employ a separate GPU. Upon launch of the graphics application, one action performed by the application can be creation of a collection of pipeline objects that may include state information, fragment shaders, and vertex shaders.

As noted above, embodiments of the subject matter disclosed herein include the use and execution of software. As such, an illustrative description of a computing software architecture is provided in a layer diagram in FIG. 3. Like the hardware examples, the software architecture in the example of FIG. 3 discussed herein is not intended to be exclusive in any way, but rather to be illustrative. This is especially true for layer-type diagrams which software developers tend to express in somewhat differing ways. In this case, the description begins with layers starting with the base hardware layer 395 illustrating hardware 340, which may include CPUs and GPUs (e.g., GPUs utilizing the hybrid bound and bindpoint emulation texture memory access techniques described herein) or other processing and/or computer hardware, as described above. Above the hardware layer is the operating system (O/S) kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, all components of a particular software element may not behave entirely in that manner.

Returning to FIG. 3, layer 385 is the O/S services layer, exemplified by O/S services 350. O/S services 350 may provide core O/S functions in a protected environment. In addition, O/S services 350 shown in layer 385 may include frameworks for OpenGL® 351, Metal® 352, Software Raytracer 353, and a Pure Software Rasterizer 354 (OpenGL is a registered trademark of Hewlett Packard Enterprise Development LP, and Metal is a registered trademark of Apple, Inc.). These particular examples all relate to graphics and/or graphics libraries, all of which relate to graphics handling. These particular examples also represent graphics frameworks/libraries that may operate in the lower tier of frameworks, such that developers may use shading and graphic primitives and/or obtain fairly tightly coupled control over the graphic hardware. In addition, the particular examples named in layer 385 may pass their work product directly to hardware or hardware drivers, which may be software that is tightly coupled to the hardware.

Referring still to FIG. 3, OpenGL® 351 represents an example of a well-known library and application programming interface (API) for graphics rendering including two-dimensional (2D) and 3D graphics. Metal® 352 also represents a published graphic library and framework, but it is lower level than OpenGL® 351, supporting fine-grained, low-level control of the organization, processing, and submission of graphic and computational commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphic hardware (e.g., using only the CPU). These libraries or frameworks shown within the O/S services layer 385 are only illustrative and are intended to show the general level of the layer and how it relates to other software in a sample arrangement (e.g., lower level kernel operations and higher-level applications services 360). In addition, Metal® 352 represents a published framework/library of Apple Inc. usable by developers of graphics applications.

Above the O/S services layer 385 is an application services layer 380, which includes a game engine 361, a 3D rendering engine 362, an animation engine 363, and a rendering engine 364. The O/S services layer 385 represents higher-level frameworks that are directly accessed by application programs. In some embodiments the O/S services layer 385 includes graphic-related frameworks that are high level in that they are agnostic to the underlying graphic libraries (such as those discussed with respect to layer 385). In such embodiments, these higher-level graphic frameworks are meant to provide developers access to graphics functionality in a more user- and developer-friendly way and to allow developers to avoid work with shading and graphic primitives. By way of example, the game engine 361 may be a graphics rendering and animation infrastructure and may be used to animate two-dimensional (2D) textured images. The 3D rendering engine 362 may be a 3D-rendering framework that helps the import, manipulation, and rendering of 3D assets at a higher level than frameworks having similar capabilities, such as OpenGL®. Animation engine 363 may be a graphic rendering and animation infrastructure and may be used to animate views and other visual elements of an application. Rendering engine 364 may be a two-dimensional drawing engine for providing 2D rendering for applications.

Application layer 375 resides above the application services layer 380. Application layer 375 comprises any number and type of application programs. By way of example, FIG. 3 shows three specific applications: photos 371 (a photo management, editing, and sharing program), financial management application 372, and movie application 373 (a movie making and sharing program). Application layer 375 also shows two generic applications A 370 and B 374, which represent any other applications that may interact with or be part of the disclosed embodiments. Generally, embodiments of the disclosed subject matter employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce illustrative frameworks that may be discussed herein. Furthermore, in some examples, the frameworks in layer 380 make use of the libraries represented in layer 385. Thus, FIG. 3 provides intellectual reinforcement for these examples. FIG. 3 is not intended to limit the types of frameworks or libraries that may be used in any particular way or in any particular embodiment. Generally, many embodiments of this disclosure propose software activity and architecture in the layers between the hardware 340 and application 375 layers.

With reference again to FIG. 3, some embodiments include the use of higher-level frameworks, such as those shown in application services layer 380. The high-level frameworks may perform intelligent analysis on particular graphics requests from application programs. The high-level framework may then choose a specific hardware and/or a specific library or low-level framework to help process the request. In these embodiments, the intelligent analysis may provide for on-the-fly decision making regarding the best path for the graphic request to follow down to hardware.

Figure 4:
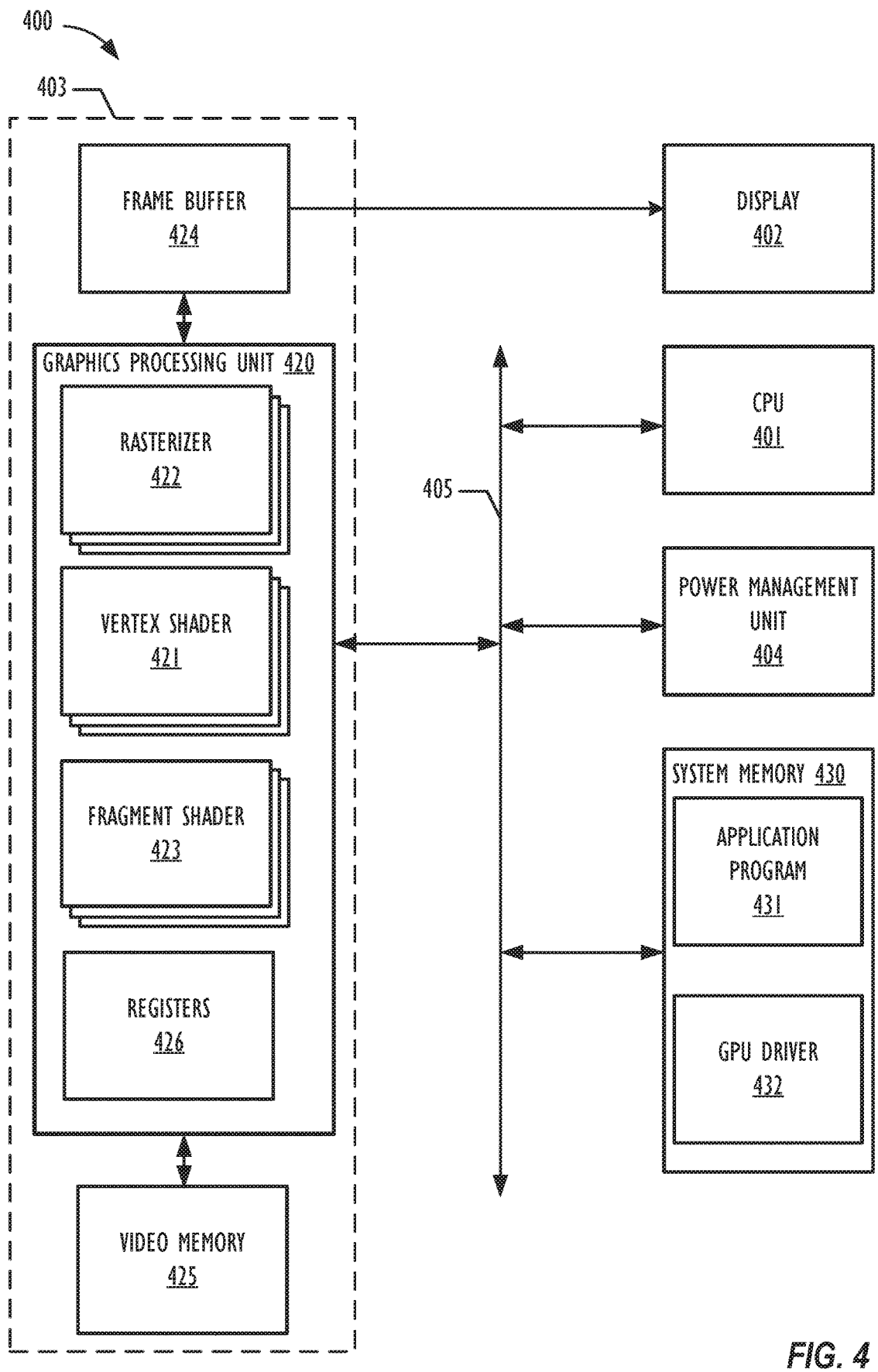
FIG. 4 is block diagram illustrating a computer system for implementing one or more aspects of the disclosed subject matter according to an embodiment of the disclosure.

Referring now to FIG. 4, a block diagram of computing system 400 illustrates a computer system according to an embodiment in additional detail. Computing system 400 includes a CPU 401, a graphic processing system 403, a display 402, a power management unit (PMU) 404, and system memory 430. In one embodiment, CPU 401 and graphics processing system 403 are included on separate integrated circuits (ICs) or IC packages. In other embodiments, however, CPU 401 and graphics processing system 403, or the collective functionality thereof, may be included in a single IC or package.

The representative graphics processing system 403 may act to process application data and render graphical representations of virtual objects to a display 402. For example, a CPU 401 may receive a request from application code (not shown) to render a graphic. The request may be via an internal or third-party graphics library and framework. The graphic may be a portion of a model of a virtual object comprising one or more polygons, such as a triangle. This request may reference data stored, for example, in system memory 430 or video memory 425.

Data bus 405 connects different elements of the computing system 400 including CPU 401, system memory 430, and graphic processing system 403. In an embodiment, system memory 430 includes instructions that cause the CPU 401 and/or graphics processing system 403 to perform the functions ascribed to them in this disclosure. More specifically, graphics processing system 403 can receive instructions transmitted by CPU 401 and processes the instructions to render and display graphic images on display 402.

System memory 430 may include application program 431 and GPU driver 432. The graphics processing system 403 in this example include a frame buffer 424, a GPU 420 and video memory 425. The GPU 420 may include a graphical pipeline including one or more vertex shaders 421, one or more rasterizers 422, one or more fragment shaders 423, and one or more GPU registers 426. The one or more GPU registers 426 may comprise a memory located on a processor and separate from caches or other memories, such as the video memory 425 and system memory 430. In certain systems, texture metadata may be stored in the one or more GPU registers 426 to allow for quick access during a draw call operation. In certain systems, video memory 425 may include texture buffers comprising logical portions of the video memory 425 in which texture metadata may be stored and accessed for the draw call operation. These texture buffers may be used to emulate hardware registers to enable storing a larger number of texture metadata than there are available GPU registers 425. In some embodiments, a unified memory model may be supported where system memory 430 and video memory 425 comprise a single memory utilized by both the GPU 420 and CPU 401 rather than discrete memory systems. As used herein, application code may refer to code executing on CPU 401 during application run time, separate from graphical functions, which may execute on GPU 420. Graphical functions may execute on the GPU, for example, as hardware components of GPU 420, such as shaders, may be programmable, allowing for graphical functions to execute on GPU 420. Application programming interface (API) and Driver software, executing on CPU 401 may facilitate interactions between application code and graphical functions, such as by providing an interface between application code and GPU 420 and allowing the application code to set up and execute graphical functions on GPU 420.

In certain cases, the frame buffer 424 may be located in system memory 430. In some embodiments, the frame buffer 424 may be located in video memory 425 or as a dedicated memory. In an embodiment, application program 431 includes code written using the API. The API includes a predetermined, standardized set of commands that are executed by associated hardware. Application program 431 generates API commands to render an image by one or more shading engines and/or rasterizer of GPU 420 for display. GPU driver 432 translates the high-level API commands into machine code programs that are executable by the GPU 420.

In one embodiment, CPU 401 transmits API commands to GPU 420 to render graphic data and store rendered images in frame buffer 424 to be displayed on display 402. An image may be rendered by dividing the image into multiple sections of a grid where each section is known as a tile. Each tile may be rendered separately to video memory 425 by GPU 420. Rendering a single tile, rather than an entire frame at once, helps reduce the amount of memory and bandwidth needed for rendering. In certain cases, multiple tiles may be rendered independently, for example in parallel graphic pipelines. Upon completion of all tiles of a frame, frame buffer 424 may output the image to display 402. Common tile sizes include 16×16 pixels and 32×32 pixels, although arbitrarily sized tiles could also be used.

GPU 420 can include a plurality of multiprocessors that are configured to execute multiple threads in parallel. In certain cases, the multiprocessors may be configured as shaders and rasterizers. Generally, the GPU 420 may render a view of a virtual object using the virtual object's model coordinate system. The virtual object may be rendered from the point of view of a camera at a specified location. The vertex shaders 421 perform matrix operations on the coordinates of a particular polygon to determine coordinates at which to render the polygon from the point of view of the camera based on the model coordinates. The rasterizer 422 determines which pixels of the display are intersected by the polygon. The fragment shader 423 then assigns a color value to each of the pixels intersected by the polygon. This color value may be based, for example, on contents of a particular texture read from memory. This texture may be stored in memory 430 or video memory 425. Shaders may be programmable as a part of a programmable GPU pipeline using shader functions to allow for increased flexibility and functionality of the shaders. This programmability also allows the GPU to perform non-graphical, data-parallel tasks. In certain embodiments, the rasterizer 422 may be a fixed function of the GPU pipeline to allow for increased performance. Functionality of the rasterizer 422 may be adjusted via arguments or commands passed into the rasterizer 422, for example by the API or GPU driver 432. After the polygon is shaded, the polygon may be written to a frame buffer in video memory 424 for use by the display 402.

PMU 404 is responsible of distributing power among different components of computing system 400. Powering-up GPU 420 is part of an initialization operation to prepare GPU 420 for execution of a graphics command. In an embodiment, PMU 404 may access power management policies regarding the power consumption of CPU 401 and GPU 420. For example, a workload may be assigned to CPU 401, GPU 420, or the combination of the two. Then, considering the amount of work required by each component, PMU 404 may optimize power distribution to conserve most energy. In one example, when no workload is assigned to GPU 420 for execution or when GPU 420 is waiting idle for the next workload, PMU 404 may place GPU 420 in a sleep mode and may cause to be minimal, if any, power to be consumed by the GPU 420.

According to certain examples, application code, or a higher layer, may request a graphics framework to render a frame for display. Rendering a frame may require one or more rendering passes and multiple graphical API function calls. Graphical API function calls may be used to setup and execute programmable graphical functions such as a rendering pass. A graphical API function call may include information describing one or more virtual objects for display. This description may include resources for use by the rendering pipeline, such as one or more polygons, or primitives, texture information, samples, as well as information defining the state of the rendering pipeline. For example, an application code may attempt to render a virtual object, such as a wall, using a set of vertices describing polygons, which make up an apparent structure of the wall, along with textures which may be placed on the polygons. In setting up the GPU for a render pass, the application code may call a first API to pass polygon information, a second API to pass a texture, and a third API to pass a sampler for use by, for example, a shader function.

Typically, a shader renders a texture to a polygon based on metadata describing the texture, such as a height and width of the texture, along with a pointer to the texture itself. To make this texture metadata accessible to a shader, texture metadata may be loaded into GPU registers 426 that are accessible to the shaders in a process called texture binding. Once bound, the shaders may then access the texture metadata when rendering the texture on a corresponding polygon.

One drawback to texture binding is that a number of textures that may be bound may be limited based on the number of GPU registers available. Certain use cases can benefit from being able to access larger sets of textures. For example, ray tracing may require an ability to access textures for an entire scene, including all polygons both within a view of a certain viewpoint, and those not within the view of the viewpoint. Bindless operation for textures may be used in place of texture binding to avoid having to load texture metadata into GPU registers 426. Typically, in bindless operations, texture metadata is stored in video memory 425 and the GPU is configured to enable shaders to directly access the video memory 425. For example, an application may, via one or more graphical API functions, store texture metadata to a buffer in the video memory 425 and obtain a handle or pointer to the stored texture metadata. This handle or pointer may be passed to the shaders to allow the shaders to access the texture metadata and the texture itself.

Figure 5:
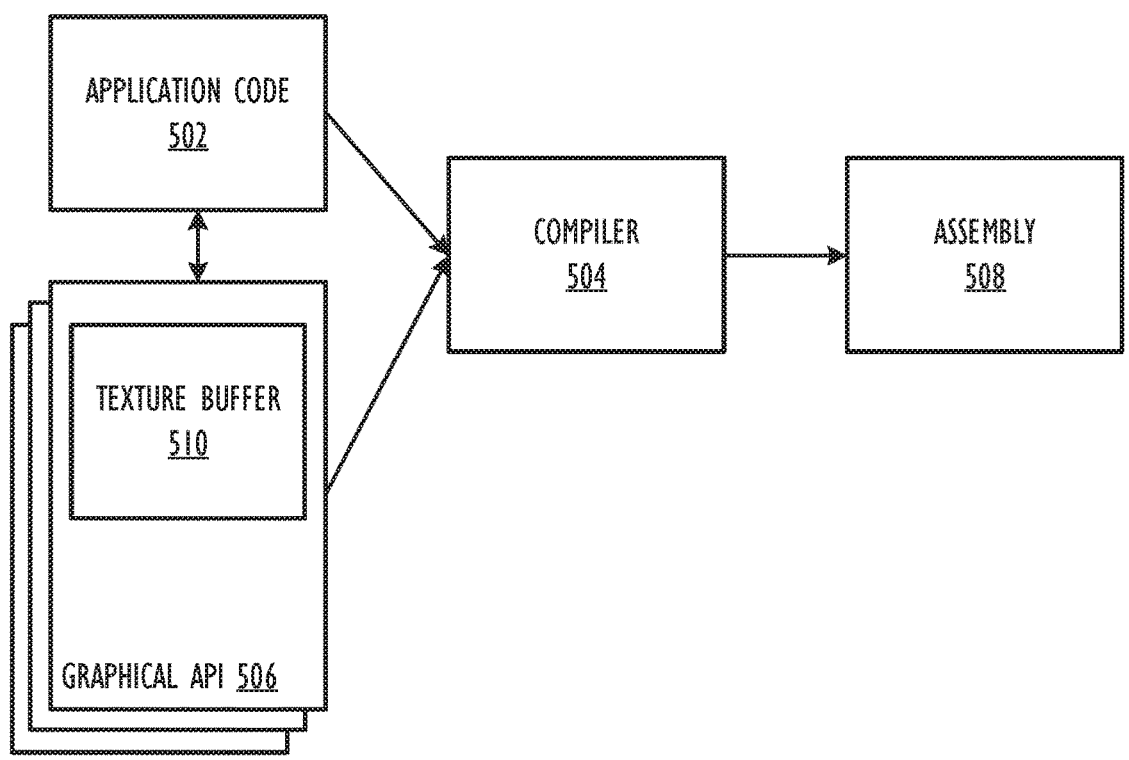
FIG. 5 is a block diagram of a GPU programming model, in accordance with aspects of the present disclosure.

FIG. 5 is a block diagram of a GPU programming model 500, in accordance with aspects of the present disclosure. As shown, the GPU programming model 500 includes application code 502, which is a high-level application program utilizing the GPU, which calls into one or more graphical APIs 506. The application code 502 is compiled by a compiler 504 into assembly language program objects useable by the GPU. More specifically, the compiler 504 translates the application code 502 into specific compiled software objects in the form of assembly code 508 useable, for example, to program the fragment and vertex shaders, rasterizers, and other GPU elements. As an example for this case, the compiler 504 may translate high-level API calls from the application code 502 into assembly code 508 which can create and store texture metadata.

In certain cases, accessing texture metadata from video memory can take more time as compared to accessing texture metadata from GPU registers as GPU registers may be located closer to the GPU cores and operate at the same speed as the GPU cores. In accordance with aspects of the present disclosure, texture binding may be performed based on GPU register resources available, and bindless operation may be utilized if additional textures are needed. For example, texture metadata for a predefined number of textures may be bound and once this predefined number of textures are exceeded, additional textures may be accessed using bindless operations. As a more specific example, the graphical APIs 506 may be configured to define one or more texture buffers 510. These texture buffers 510 may be stored in a video memory or other accessible memory space at run time and managed by functions of the graphical APIs 506. The texture buffer 510, in certain cases, may include a set of slots where the total number of slots define a maximum number of textures that may be included in a single draw call. Generally, the draw call refers to a function, typically of the graphical API 506, which indicates to the GPU to render a scene and is typically placed after other elements of the scene have been defined (e.g., shaders, textures, polygons, etc.). The application code 502 may be configured to place texture metadata for each texture needed for rendering a scene in the texture buffer 510. Specific texture metadata may then be referenced based on an address (e.g., an offset, slot number, etc.) of the texture metadata within the texture buffer 510. The application code 502 may then issue a draw command based on the texture buffer 510.

Once the draw command is issued, the textures in the texture buffer 510 may be locked such that the contents of the texture buffer 510 cannot be modified by the application code 502 until the draw command finishes execution. The GPU can fetch texture metadata from the texture buffer 510 as needed based on, for example, the addresses for the texture metadata.

In certain cases, this switching between bound textures and bindless textures may be managed by, for example, graphical API functions or a graphical framework. For example, the graphical framework may internally track a number of textures being used by an application. When the number of textures is below a threshold number, such as 32 textures, 96 textures, 128 textures, etc. (depending on a given implementation), metadata and pointers associated with new textures may be bound to available GPU registers. When the number of textures is above the threshold, bindless operations may be performed with handles or pointers referencing in-memory texture metadata being handled by the graphical framework. A person having ordinary skill in the art would understand that behavior for when the number of textures is equal to the threshold depends on the exact relationship of the threshold to the number of GPU registers, which is a design choice and thus either texture binding or bindless operations could be performed. Determining the number of textures can be performed by counting or tracking the number of slots used by an application in the texture buffer 510.

Figure 6:
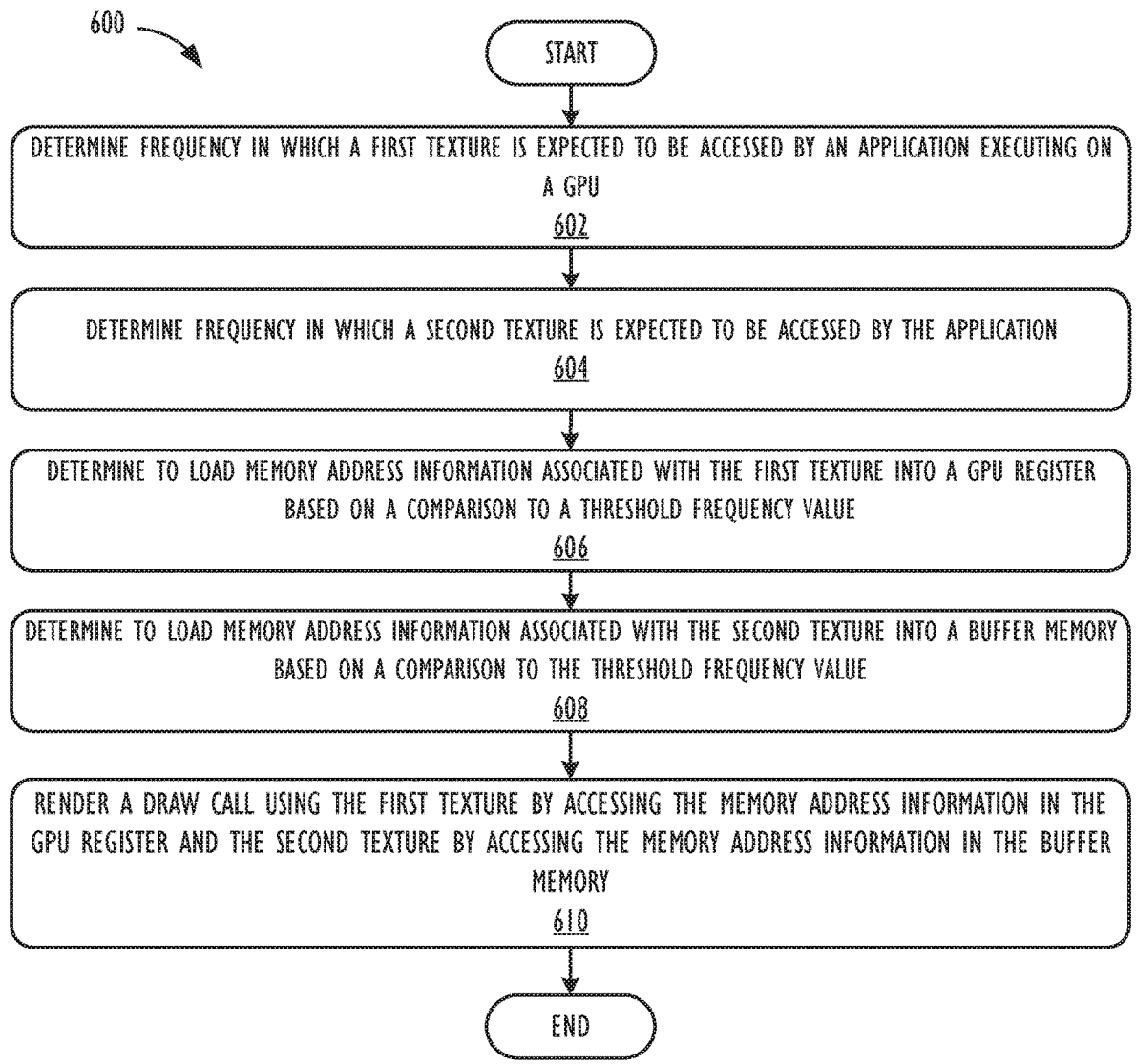
FIG. 6 is a flow diagram illustrating a technique for accessing textures by a graphics processor, in accordance with aspects of the present disclosure.

FIG. 6 is a flow diagram illustrating a technique for accessing textures by a graphics processor 600, in accordance with aspects of the present disclosure. In cases where bindless operations need to be performed, textures may be bound based on one or more criteria. For example, at step 602, a frequency with which a first texture is expected to be accessed by an application executing on a graphics processing unit (GPU) may be determined. For example, a compiler, when compiling the application code, may estimate a number of times a particular texture, and hence the texture metadata associated with the texture, is expected to be read. As determining, prior to execution, exactly how code will execute is difficult, estimates as to how often a texture is expected to be read may be used. These estimates may be based on one or more heuristics obtained by analyzing the application code when the code is being compiled. Textures which are referenced inside of loops (or within multiple loops (e.g., nested loops)), for example, may be expected to be read more often than textures which are not referenced within a loop. A type of loop may also be considered as a part of the estimate. An expected frequency score may be associated with the texture based on the estimate of how often a texture is expected to be read. Textures which are expected to be referenced more often may be candidates for binding into a GPU register. Similarly, at step 604, a frequency with which a second texture is expected to be accessed by an application may be determined.

At step 606, a determination is made to load memory address information associated with the first texture into a GPU register based on a comparison to a threshold frequency value. For example, the expected frequency score may be compared as against a threshold frequency value to determine whether the texture metadata associated with the texture should be bound. In certain cases, the threshold frequency may be based on expected frequency scores of other textures in the texture buffer and the number of GPU registers available. At block 608, a determination is made to load memory address information associated with the second texture into a buffer memory when the frequency is less than the threshold frequency value. For example, where a GPU has 128 available bind points for textures (e.g., registers) the expected frequency score for the texture may be compared to the 128 highest expected frequency scores and if the expected frequency score for the texture is higher than one or more of the 128 highest expected frequency scores, the texture metadata associated with the texture may be bound (e.g., loaded) into a GPU register. If the expected frequency score for the texture is lower than one or more of the 128 highest expected frequency scores, the texture metadata associated with the texture may be placed into buffer memory, such as in the video memory 425.

At block 610, a draw call utilizing the first and second textures is rendered using the first texture by accessing the address information in the GPU register and the second texture by accessing the memory address information in the buffer memory. For example, the draw call is rendered, at least in part, by accessing the texture metadata stored in the GPU register. The draw call is also rendered, at least in part, by accessing texture metadata that is not in the GPU register, but stored in another location, such as in video memory.

In certain cases, determining whether to bind a texture or use bindless operations may be based on other criteria, such as an order of the textures, a location of the texture metadata in the buffer, or a marker, such as a flag or bit(s) of information. For example, whether to bind a texture may be based on an order in which the texture metadata is placed into the texture buffer, with the first N number of texture metadata placed into the texture buffer bound, where N is based on the number of available bind points. As another example, whether to bind a texture may be based on the slot in which the texture metadata is placed, with texture metadata placed into the first N slots of the texture buffer bound. In yet other cases, flags or bits may be set by the application program indicating which texture metadata to bind. Additionally, compiler flags may be provided, for example, to select how to determine whether to bind a texture or use bindless operations.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed:

1. A computer-implemented method for accessing textures by a graphics processor, the method comprising:
    estimating a first frequency with which a first texture is expected to be accessed by an application executing on a graphics processing unit (GPU) based on how the first texture is referenced within a code of the application;
    estimating a second frequency with which a second texture is expected to be accessed by the application executing on the GPU based on how the second texture is referenced within the code of the application;
    determining to load memory address information associated with the first texture into a GPU register based on a first comparison of the first frequency with a threshold frequency value;
    determining to load memory address information associated with the second texture into a buffer memory based on a second comparison of the second frequency with the threshold frequency value; and
    rendering a draw call using:
        the first texture by accessing the memory address information in the GPU register; and
        the second texture by accessing the memory address information in the buffer memory.

2. The method of claim 1, wherein determining to load the memory address information associated with the first texture into the GPU register further comprises determining that fewer than a maximum number of GPU registers are already bound for use.

3. The method of claim 1, wherein determining to load memory address information associated with the second texture into the buffer memory further comprises determining that a maximum number of GPU registers are already bound for use.

4. The method of claim 1, wherein the frequency with which the first texture or the second texture is expected to be accessed is determined during compilation of the application code.

5. The method of claim 4, wherein the frequency with which the first texture or the second texture is expected to be accessed is determined based at least in part on one or more heuristics.

6. The method of claim 5, wherein the one or more heuristics includes at least one of whether the first texture or the second texture is accessed within a loop or if the first texture or the second texture is accessed within nested loops.

7. The method of claim 1, wherein the threshold frequency value is based on expected frequency scores associated with other textures to be included in the draw call.

8. A non-transitory program storage device comprising instructions stored thereon to cause one or more graphics processors to:
    estimate a frequency with which a texture is expected to be accessed by an application executing on a graphics processing unit (GPU) based on how the first texture is referenced within a code of the application;
    determine whether to load memory address information associated with the texture into a GPU register or a buffer memory based on a comparison of the frequency with a threshold frequency value;
    in response to determining that the memory address information has been loaded into the GPU register rendering a draw call using the texture by accessing the memory address information in the GPU register; and
    in response to determining that the memory address information has not been loaded into the GPU register, rendering the draw call using the texture by accessing the memory address information in the buffer memory.

9. The non-transitory program storage device of claim 8, wherein determining to load the memory address information associated with the texture into the GPU register further comprises determining that fewer than a maximum number of GPU registers are already bound for use.

10. The non-transitory program storage device of claim 8, wherein determining to load memory address information associated with the texture into the GPU register or the buffer memory further comprises determining that a maximum number of GPU registers are already bound for use.

11. The non-transitory program storage device of claim 8, wherein the frequency with which the texture is expected to be accessed is determined during compilation of the application code.

12. The non-transitory program storage device of claim 11, wherein the frequency with which the texture is expected to be accessed is determined based at least in part on one or more heuristics.

13. The non-transitory program storage device of claim 12, wherein the one or more heuristics includes at least one of whether the texture is accessed within a loop or if the texture is accessed within nested loops.

14. The non-transitory program storage device of claim 8, wherein the threshold frequency value is based on expected frequency scores associated with other textures to be included in the draw call.

15. An electronic device, comprising:
a memory;
a display;
a user interface; and
one or more graphic processors operatively coupled to the memory, wherein the one or more graphic processors are configured to execute instructions causing the one or more graphic processors to:
estimate a first frequency with which a first texture is expected to be accessed by an application executing on a graphics processing unit (GPU) based on how the first texture is referenced within a code of the application;
estimate a second frequency with which a second texture is expected to be accessed by the application executing on the GPU based on how the second texture is referenced within a code of the application;
determine to load memory address information associated with the first texture into a GPU register based on a first comparison of the first frequency with a threshold frequency value;
determine to load memory address information associated with the second texture into a buffer memory based on a second comparison of the second frequency with the threshold frequency value; and
render a draw call using:
the first texture by accessing the memory address information in the GPU register; and
the second texture by accessing the memory address information in the buffer memory.

16. The electronic device of claim 15, wherein the instructions to determine to load the memory address information associated with the first texture into the GPU register further cause the one or more graphic processors to determine that fewer than a maximum number of GPU registers are already bound for use.

17. The electronic device of claim 15, wherein the instructions to determine to load memory address information associated with the second texture into the buffer memory further cause the one or more graphic processors to determine that a maximum number of GPU registers are already bound for use.

18. The electronic device of claim 15, wherein the frequency with which the first texture or the second texture is expected to be accessed is determined during compilation of the application code.

19. The electronic device of claim 18, wherein the frequency with which the first texture or the second texture is expected to be accessed is determined based at least in part on one or more heuristics.

20. The electronic device of claim 19, wherein the one or more heuristics includes at least one of whether the first texture or the second texture is accessed within a loop or if the first texture or the second texture is accessed within nested loops.

* * * * *

UNITED STATES PATENT AND TRADEMARK OFFICE
CERTIFICATE OF CORRECTION

Page 1 of 1

PATENT NO. : 11,010,863 B2
APPLICATION NO. : 16/786173
DATED : May 18, 2021
INVENTOR(S) : Michael Imbrogno et al.

It is certified that error appears in the above-identified patent and that said Letters Patent is hereby corrected as shown below:

In the Specification

Column 7 Line 33: replace the phrase "GPU registers 425" with the phrase --GPU registers 426--;

Column 8 Line 35: replace the phrase "video memory 424" with the phrase --video memory 425--;

In the Claims

Column 12 Line 44: replace the phrase "the first texture" with the phrase --the texture--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*